(12) United States Patent
Ohmi et al.

(10) Patent No.: US 8,807,573 B2
(45) Date of Patent: Aug. 19, 2014

(54) METAL GASKET

(75) Inventors: Tadahiro Ohmi, Sendai (JP); Yasuyuki Shirai, Sendai (JP); Koji Sato, Gojo (JP); Yoshinori Uchino, Gojo (JP); Masamichi Iwaki, Gojo (JP)

(73) Assignees: Tohoku University, Miyagi (JP); Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 13/981,218

(22) PCT Filed: Jan. 12, 2012

(86) PCT No.: PCT/JP2012/050429
§ 371 (c)(1),
(2), (4) Date: Jul. 23, 2013

(87) PCT Pub. No.: WO2012/102082
PCT Pub. Date: Aug. 2, 2012

(65) Prior Publication Data
US 2013/0300070 A1 Nov. 14, 2013

(30) Foreign Application Priority Data

Jan. 24, 2011 (JP) .................. 2011-011984

(51) Int. Cl.
*F16J 15/02* (2006.01)
*F16J 15/08* (2006.01)

(52) U.S. Cl.
CPC ............... *F16J 15/08* (2013.01); *F16J 15/027* (2013.01); *F16J 15/0881* (2013.01); *F16J 15/0893* (2013.01)

USPC .......................................... 277/643; 277/644

(58) Field of Classification Search
CPC ......... F16J 15/02; F16J 15/022; F16J 15/027; F16J 15/028; F16J 15/064; F16J 15/08; F16J 15/0887; F16J 15/0893
USPC ......... 277/603, 608, 626–627, 630, 637, 639, 277/644, 647; 285/363–368
See application file for complete search history.

(56) References Cited

U.S. PATENT DOCUMENTS

| 2,701,155 | A | * | 2/1955 | Estel, Jr. ....................... 277/555 |
| 3,346,266 | A | | 10/1967 | Bondroit |
| 3,806,138 | A | | 4/1974 | Herrington |
| 4,026,197 | A | * | 5/1977 | Lapke et al. ................... 92/186 |
| 4,218,067 | A | | 8/1980 | Halling |

(Continued)

FOREIGN PATENT DOCUMENTS

| DE | 1216634 B | 5/1966 |
| JP | 02113171 A | 4/1990 |

(Continued)

*Primary Examiner* — Vishal Patel
(74) *Attorney, Agent, or Firm* — The Webb Law Firm (57) ABSTRACT

An annular metal gasket for sealing a space between members by being pressed in the vertical direction in a state of being mounted between the members, the metal gasket comprising an annular outer ring having a substantially C-shaped cross-section and having a circumferential-direction opening formed therein, and an annular inner ring fitted inside the outer ring. The inner ring is formed so as to have a polygonal cross-section. Bend parts having an Inner angle larger than 180° are formed between the upper corner part and the inner- and outer-circumference-side corner parts; and between the lower corner part and the inner- and outer-circumference-side corner parts.

4 Claims, 10 Drawing Sheets

(56) References Cited

U.S. PATENT DOCUMENTS

| | | |
|---|---|---|
| 5,022,663 A | 6/1991 | Fages et al. |
| 7,451,989 B1 * | 11/2008 | Cornett et al. ............... 277/626 |
| 8,485,534 B2 | 7/2013 | Ohmi et al. |
| 2002/0153669 A1 | 10/2002 | Caplain et al. |

FOREIGN PATENT DOCUMENTS

| | | |
|---|---|---|
| JP | 02309063 A | 12/1990 |
| JP | 09264427 A | 10/1997 |
| JP | 2004528516 A | 9/2004 |
| JP | 2009281424 A | 12/2009 |

* cited by examiner

Prior Art

Prior Art

US 8,807,573 B2

METAL GASKET

CROSS-REFERENCE TO RELATED APPLICATIONS

This application is the United States national phase under 35 U,S,C. §371 of International Application No. PCT/JP2012/050429 filed Jan. 12, 2012, entitled "Metal Gasket", and claims priority under 35 U.S.C. §119(a)-(d) to Japanese Patent Application No. 2011-011984, filed on Jan. 24, 2011 in the Japanese Intellectual Property Office, the disclosures of which are hereby incorporated by reference in their entirety.

TECHNICAL FIELD

The present invention relates to a metal gasket that is suitable for being used in environments such as a high-temperature environment, a plasma environment, and an ultra-vacuum environment.

BACKGROUND ART

An annular metal gasket that is called a metal C-ring gasket is used as a gasket that is used in environments such as a high-temperature environment, a plasma environment, and an ultra-vacuum environment in which a gasket made of rubber cannot be used for a variety of piping and mechanical equipment for nuclear facilities and semiconductor manufacturing equipment.

A metal gasket that is called a metal C-ring gasket is configured in the manner in which an inner ring made of a metal leaf spring or a coil spring is fitted inside a metal outer ring having a substantially C-shaped cross-section as disclosed in the Patent Literatures 1 and 2 for instance. Consequently, in the case in which the metal gasket is used, a tightening force larger than that for a gasket made of rubber is required, and a load in a tightening work and a fastening means such as a flange and a bolt are enlarged unfortunately.

Under such a background, this applicant has disclosed a metal gasket in which an inner ring is formed in a polygonal shape such as a square as an annular metal gasket in which a high sealing performance can be obtained by using a less tightening force (see Patent Literature 3).

Figure 7:
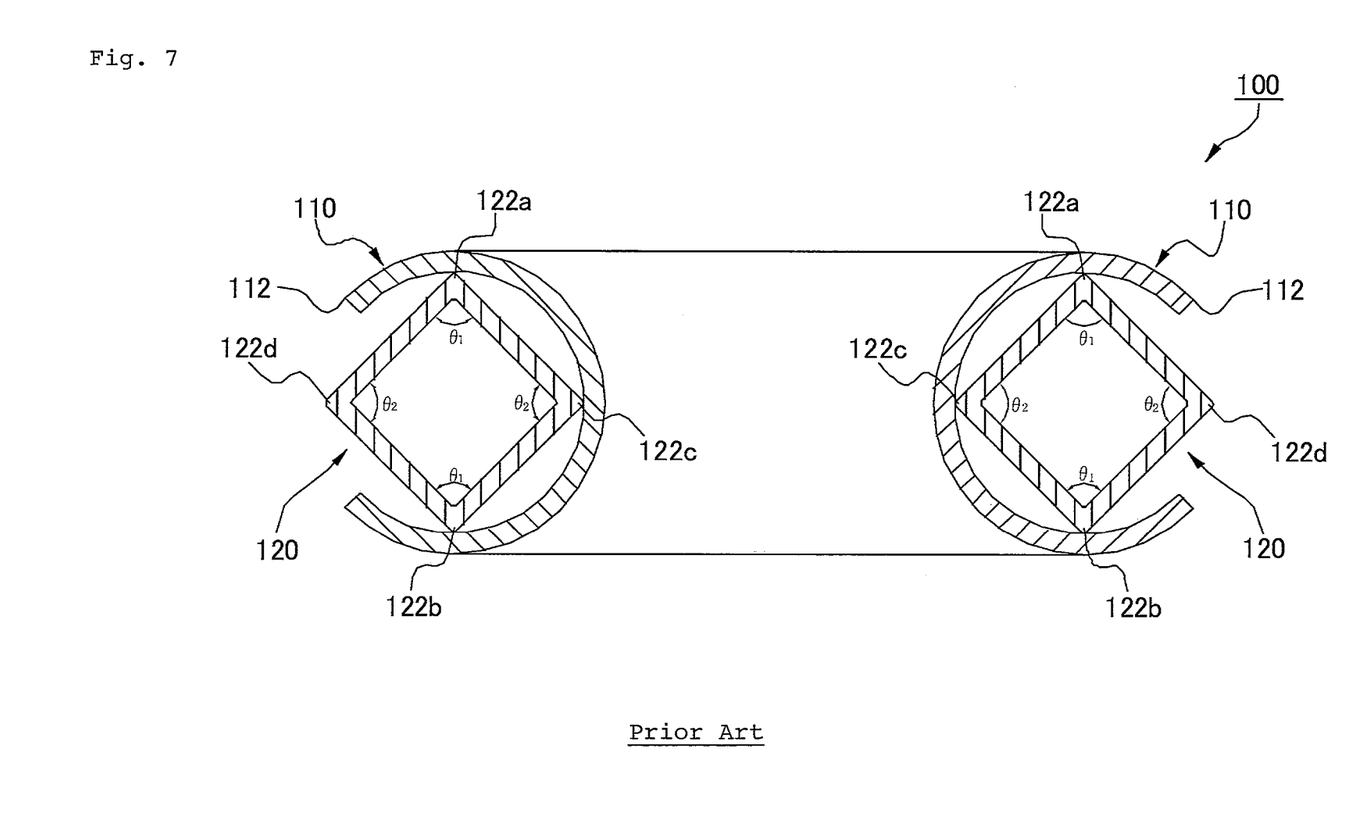
FIG. 7 is a cross-sectional view showing a metal gasket that is disclosed in Patent Literature 3 describing a prior art.
Figure 8:
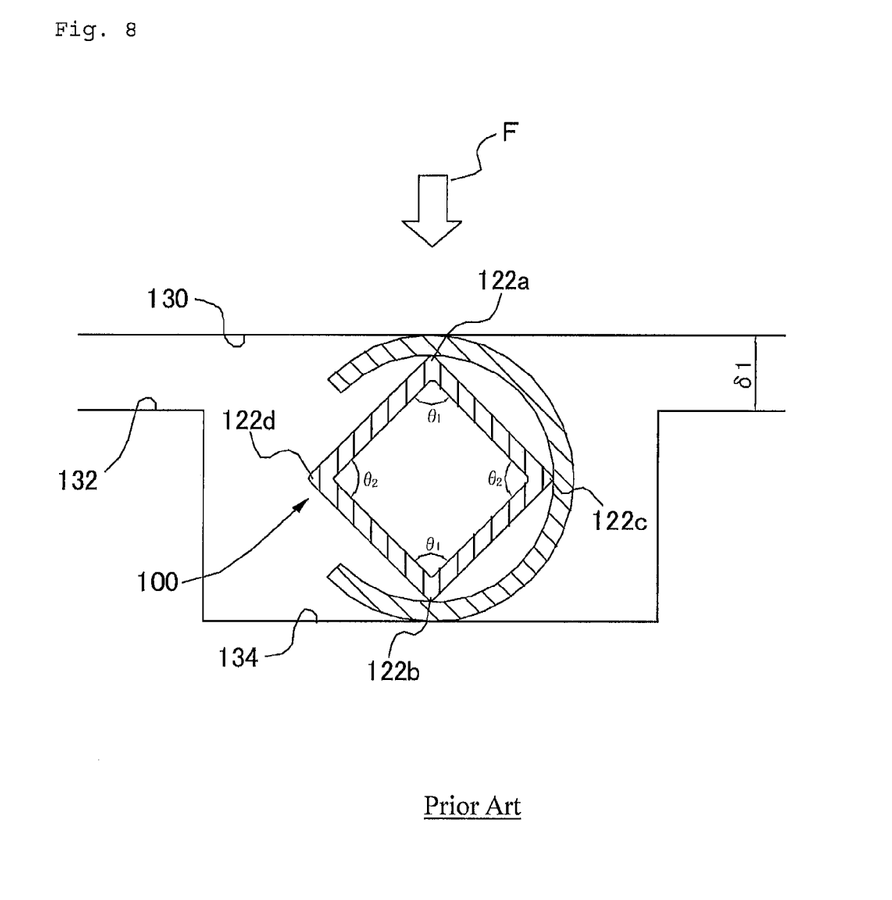
FIG. 8 is a cross-sectional view showing a state in which the metal gasket that is disclosed in Patent Literature 3 describing a prior art is mounted in a sealing groove.

FIG. 7 is a cross-sectional view showing a metal gasket that is disclosed in Patent Literature 3 describing a prior art. FIG. 8 is a cross-sectional view showing a state in which the metal gasket that is disclosed in Patent Literature 3 describing a prior art is mounted in a sealing groove.

As shown in FIG. 7, a metal gasket 100 of Patent Literature 3 is comprised of an outer ring 110 having a substantially C-shaped cross-section and having an opening 112 formed on a circumferential side and an inner ring 120 that is fitted inside the outer ring 110. As shown in FIG. 7, the inner ring 120 is formed so as to have a polygonal cross-section comprising a pair of an upper corner part 122*a* and a lower corner part 122*b* in a vertical direction of the cross section and a pair of an inner-circumference-side corner part 122*c* and an outer-circumference-side corner 122*d* in a horizontal direction of the cross section. The upper corner part 122*a* and the lower corner part 122*b* are fitted into the outer ring 110 so as to make contact with an inner side face of the outer ring 110.

As shown in FIG. 8, the metal gasket 100 of Patent Literature 3 is mounted in a sealing groove 134 that is formed in a flange 132, and is pressed in a vertical direction with a tightening force F by a flange 130 on the other side. The pair of the upper corner part 122*a* and the lower corner part 122*b* described above then strongly presses an inner side face of the outer ring 110 by a restoring force of the inner ring 120, and the upper side of the outer ring 110 and the flange 130 are partially strongly made contact with each other. In addition, the lower side of the outer ring 110 and the sealing groove 134 of the flange 132 are partially strongly made contact with each other. A space between the flange 130 and the flange 132 is sealed in such a manner that the contact part functions as a sealing part.

As described above, the metal gasket 100 of Patent Literature 3 describing a prior art is configured in such a manner that an inner side face of the outer ring 110 is pressed by the upper corner part 122*a* and the lower corner part 122*b* with a restoring force of the inner ring 120. Consequently, a high sealing performance can be obtained by a small tightening force as compared with a general metal gasket that is disclosed in Patent Literatures 1 and 2.

Figure 9:
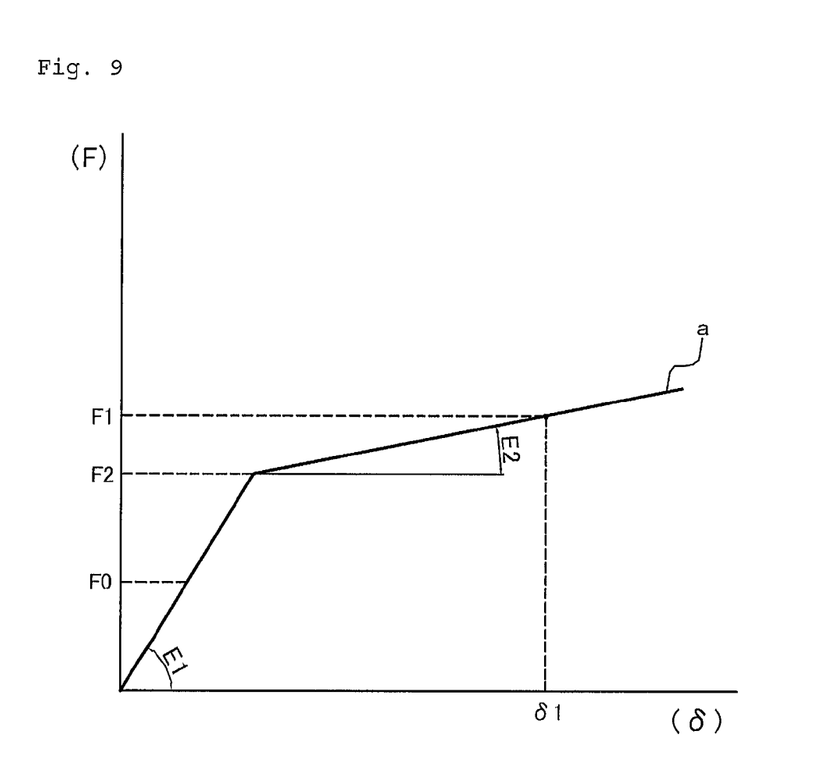
FIG. 9 is a graph for illustrating a preferable relationship between a tightening force F and a displacement amount δ for a metal gasket.

A relationship between a tightening force that is applied to a metal gasket and an amount of displacement of the metal gasket is preferably a relationship that is indicated by the line a of a graph in FIG. 9. FIG. 9 is a graph for illustrating a preferable relationship between a tightening force F and a displacement amount δ for a metal gasket. A relationship between a tightening force F and a displacement amount δ for a metal gasket 100 of Patent Literature 3 described above is generally approximated to the line a of the graph in FIG. 9. A vertical axis of the graph in FIG. 9 indicates a tightening force F and a horizontal axis of the graph in FIG. 9 indicates a displacement amount δ of the metal gasket.

As shown by the line a of the graph in FIG. 9, for a relationship between a tightening force F and a displacement amount δ for a metal gasket, it is preferable that an inclination of the line a of the graph indicates a rapid inclination E1 in the early stages.

This is because a settlement is required between a metal gasket and a flange face in order to obtain a certain level of sealing performance of a metal gasket and is it necessary that a large contact stress is applied to a sealing part of a metal gasket that comes into contact with a flange face in order to obtain the settlement. In order to apply a large contact stress to a sealing part of a metal gasket, it is preferable that an inclination E1 in the early stages of FIG. 9 indicates a rapid inclination in such a manner that a tightening force F is as large as possible to a displacement amount δ per unit.

In the case in which an inclination E1 in the early stages is gradual, it is necessary that a metal gasket is deformed greatly to apply a large contact stress to a sealing part of a metal gasket. In the case in which a tightening of a bolt is insufficient, a sufficient settlement cannot be obtained between a metal gasket and a flange face in some cases. The settlement that is said here is that a metal gasket that comes into contact with a flange face is deformed along minute concavity and convexity of the flange face and a gap between a metal gasket and a flange face is removed by bridging the concavity and convexity.

As shown by the line a of the graph of FIG. 9, for a relationship between a tightening force F and a displacement amount δ for a metal gasket, it is preferable that an inclination E2 of the line a of the graph indicates a gradual inclination after a tightening force F exceeds a predetermined tightening force F2.

This is because a metal gasket is used in the case in which a space between a flange 130 and a flange 132 is sealed as described above for instance in the case in which a space between two members is sealed. A tightening between flanges in this case is carried out until flanges come into contact with each other, that is, a metal touch of a flange face is carried out. That is, a tightening is carried out until the flanges 130 and 132 come into contact with each other in a state shown in FIG. 8 described above. In a state in which a tightening is completed, the metal gasket 100 is compressed by a displacement amount δ1.

As described above, a metal gasket is tightened until a metal touch of a flange face is carried out In the case of a metal gasket in which an inclination E2 of the line a of the graph indicates a rapid inclination, a tightening force F1 in the case of a metal touch is increased extremely and it is difficult to manage a tightening of a metal gasket.

In the case in which a management of a tightening of a metal gasket is carried out by a so-called displacement control in which a tightening is carried out until a displacement of a metal gasket becomes a predetermined displacement amount δ1, the following problems occur in some cases. In other words, an error occurs by a wave or a dimension tolerance of flange face and a sealing groove for a displacement amount of a metal touch. Therefore, in the case in which an inclination E2 of the line a of the graph indicates a rapid inclination, a tightening force is varied greatly only by a small error that occurs for a displacement amount of a metal touch. In the case in which a tightening force is decreased, a sealing performance may be deteriorated. In the case in which a tightening force is increased, a bolt is damaged or a tightening cannot be carried out until a metal touch unfortunately.

In the graph shown in FIG. 9, a symbol F0 indicates a tightening force that is required to obtain a predetermined sealing performance, and a symbol F2 indicates a tightening force in the case in which an inclination of the line a of the graph is changed from a rapid inclination E1 to gradual inclination E2. The tightening force F0 is smaller than a tightening force F1 in the case of a metal touch as a matter of course, and the tightening force F0 is smaller than a tightening force F2 described above. This is important to obtain a stable sealing performance for a metal gasket.

PRIOR ART DOCUMENTS

Patent Literature

[Patent Literature 1]
Japanese Patent Application Laid-Open Publication No. 2-113171
[Patent Literature 2]
Japanese Patent Application Laid-Open Publication No. 9-264427
[Patent Literature 3]
Japanese Patent Application Laid-Open Publication No. 2009-281424

As described above, for a relationship between a tightening force F and a displacement amount δ for a metal gasket, it is preferable that an inclination E1 of the line of the graph indicates a rapid inclination in the early stages in such a manner that a tightening force F is increased per unit displacement amount. Moreover, it is preferable that an inclination E2 of the line of the graph indicates a gradual inclination in such a manner that a tightening force F is decreased per unit displacement amount in the state in which a tightening force is larger than F0 and the metal gasket obtains a predetermined sealing performance.

Moreover, to make a metal gasket obtain a higher sealing performance with a small tightening force, it is necessary that a tightening force F1 in the case of a metal touch is decreased while a relationship between a tightening force F and a displacement amount δ as described above is maintained.

Figure 10:
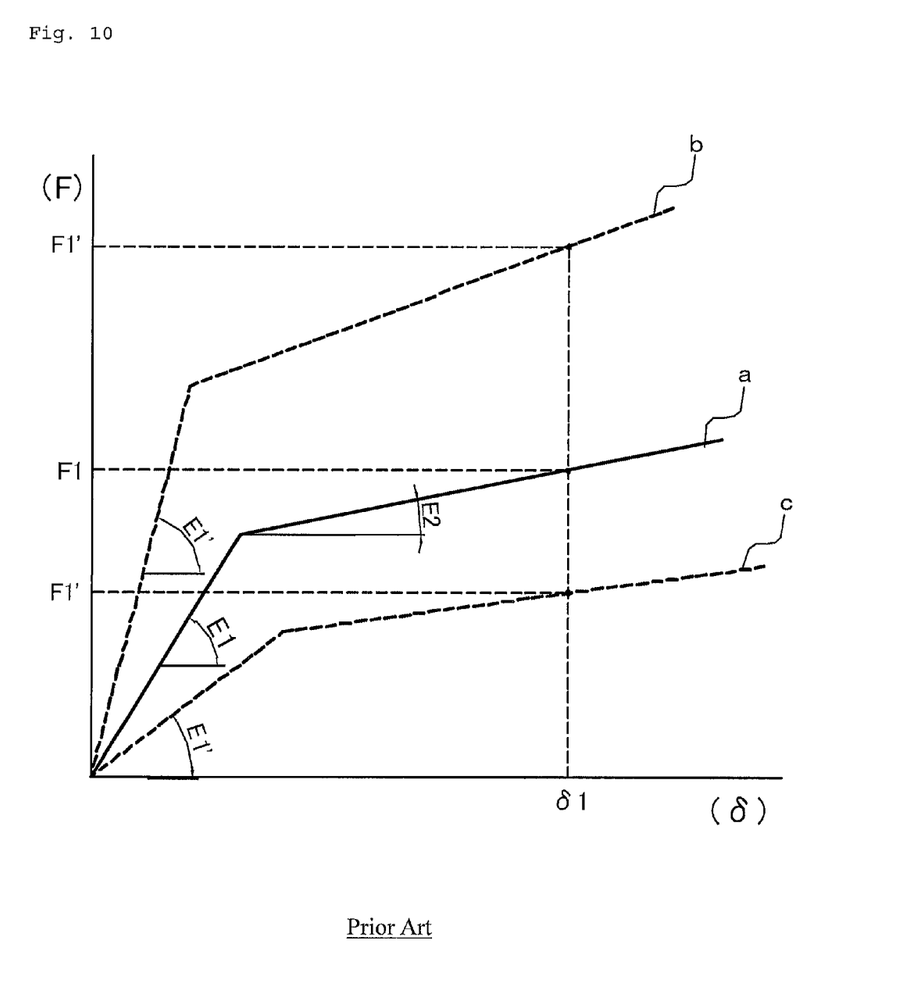
FIG. 10 is a graph for illustrating a relationship between a tightening force F and a displacement amount δ for a conventional general metal gasket.

However, it is not easy to develop a metal gasket in which a tightening force F1 in the case of a metal touch is decreased while a relationship between a tightening force F and a displacement amount δ as described above is maintained. For instance, a line b and a line c of a graph of FIG. 10 are lines that indicate a relationship between a tightening force and a displacement amount for a conventional general metal gasket that is disclosed in Patent Literatures 1 and 2. As shown in the line b of the graph of FIG. 10, in the case in which an inclination E1' of the line of the graph in the early stages is tried to be increased, a tightening force F1' in the case of a metal touch is increased in general. Moreover, a tightening force F1' in the case of a metal touch is tried to be decreased, a tightening force F1' in the early stages is gradual in general as shown in the line c of the graph of FIG. 10.

SUMMARY OF THE INVENTION

Under such a technical background, the present inventors have thought that a metal gasket can be made obtain a sealing performance almost equal to that of a metal gasket that is disclosed in Patent Literature 3 with a tightening force smaller than that of a metal gasket 100 that is disclosed in Patent Literature 3 by modifying a cross sectional shape of an inner ring 120 of the metal gasket 100 that is disclosed in Patent Literature 3.

Moreover, the present inventors have examined a relationship between inner angles θ1 and θ2 and a tightening force and a displacement amount for a metal gasket 100 that is disclosed in Patent Literature 3 shown in FIGS. 7 and 8. As a result, the present inventors have found that an inclination E in the early stages tends to be increased but a tightening force F1 in the case of a metal touch tends to be increased in the case in which an inner angle θ1 of the upper corner part 122a and the lower corner part 122b is decreased and a tightening force F1 in the case of a metal touch tends to be decreased in the case in which an inner angle θ2 of the inner-circumference-side corner part 122c and the outer-circumference-side corner 122d is decreased, and have completed the present invention.

1. A metal gasket in accordance with the present invention is characterized by an annular metal gasket for sealing a space between members by being pressed in the vertical direction in a state of being mounted between the members, the metal gasket comprising an annular outer ring having a substantially C-shaped cross-section and having a circumferential-direction opening formed therein; and an annular inner ring fitted inside the outer ring, wherein the inner ring is formed so as to have a polygonal cross-section comprising:

an upper corner part that makes contact with an upper side of an inside surface of the outer ring;

a lower corner part that makes contact with a lower side of the inside surface of the outer ring;

an inner-circumference-side corner part formed on an inner-circumference side of the inner ring so as to be positioned between the upper corner part and the lower corner part; and an outer-circumference-side corner formed on an outer-circumference side of the inner ring so as to be positioned between the upper corner part and the lower corner part, and bend parts having an inside angle larger than 180° are formed between the upper corner part and the inner- and outer-circumference-side corner parts; and between the lower corner part and the inner- and outer-circumference-side corner parts.

By this configuration, a metal gasket can be provided in which it obtains a sealing performance almost equal to that of a metal gasket that is disclosed in Patent Literature 3 with a tightening force smaller than that of a metal gasket that is disclosed in Patent Literature 3 shown in FIGS. 7 and 8.

Moreover, a metal gasket can be provided in which a tightening management of the metal gasket can be easily carried out since a tightening force until a metal touch can be decreased as compared with a metal gasket that is disclosed in Patent Literature 3 shown in FIGS. 7 and 8.

In the above invention, it is preferable that a cross section of the inner ring is formed in a line symmetric shape in a vertical direction.

By this configuration, in the case in which a metal gasket is pressed in a vertical direction, the inner ring is deformed in a generally line symmetric shape in a vertical direction and in a horizontal direction of the cross section. Consequently, the inner ring can be prevented from being shifted or inclined at an angle, whereby the inner ring can be held on the inside of the outer ring in a stable state.

In the above invention, the metal gasket in accordance with the present invention is characterized by further comprising a second bend part having an inside angle smaller than 180° between the upper corner part and the bend part formed between the upper corner part and the inner-circumference-side corner part, between the upper corner part and the bend part formed between the upper corner part and the outer-circumference-side corner part, between the lower corner part and the bend part formed between the lower corner part and the inner-circumference-side corner part, and between the lower corner part and the bend part formed between the lower corner part and the outer-circumference-side corner part.

By this configuration, a metal gasket can be provided in which it obtains a sealing performance almost equal to that of a metal gasket that is disclosed in Patent Literature 3 shown in FIGS. 7 and 8 with a smaller tightening force. Moreover, a metal gasket can be provided in which a tightening management of the metal gasket can be more easily carried out since a tightening force until a metal touch can be decreased.

Advantageous Effects of Invention

In accordance with the present invention, a metal gasket can be provided in which it obtains a sealing performance almost equal to that of a metal gasket that is disclosed in Patent Literature 3 describing a prior art with a tightening force smaller than that of a metal gasket that is disclosed in Patent Literature 3 describing a prior art shown in FIGS. 7 and 8. In accordance with the present invention, since a tightening force can be made smaller than that of a conventional metal gasket, a flange can be thinned, an apparatus can be made compact and light, and a cost can be reduced. Moreover, a material (such as ceramics) that may be easily damaged as compared with a metal can also be used as a material of a flange.

Moreover, a metal gasket can be provided in which a tightening management of the metal gasket can be easily carried out since a tightening force until a metal touch can be decreased as compared with a metal gasket that is disclosed in Patent Literature 3 describing a prior art shown in FIGS. 7 and 8.

BRIEF DESCRIPTION OF THE DRAWINGS

FIG. 1 is a partially enlarged cross-sectional view showing a state in which a metal gasket in accordance with the present invention is used for a flange part of piping or the like;

DESCRIPTION OF THE INVENTION

An embodiment of the present invention will be described below in detail with reference to the drawings.

Figure 1:
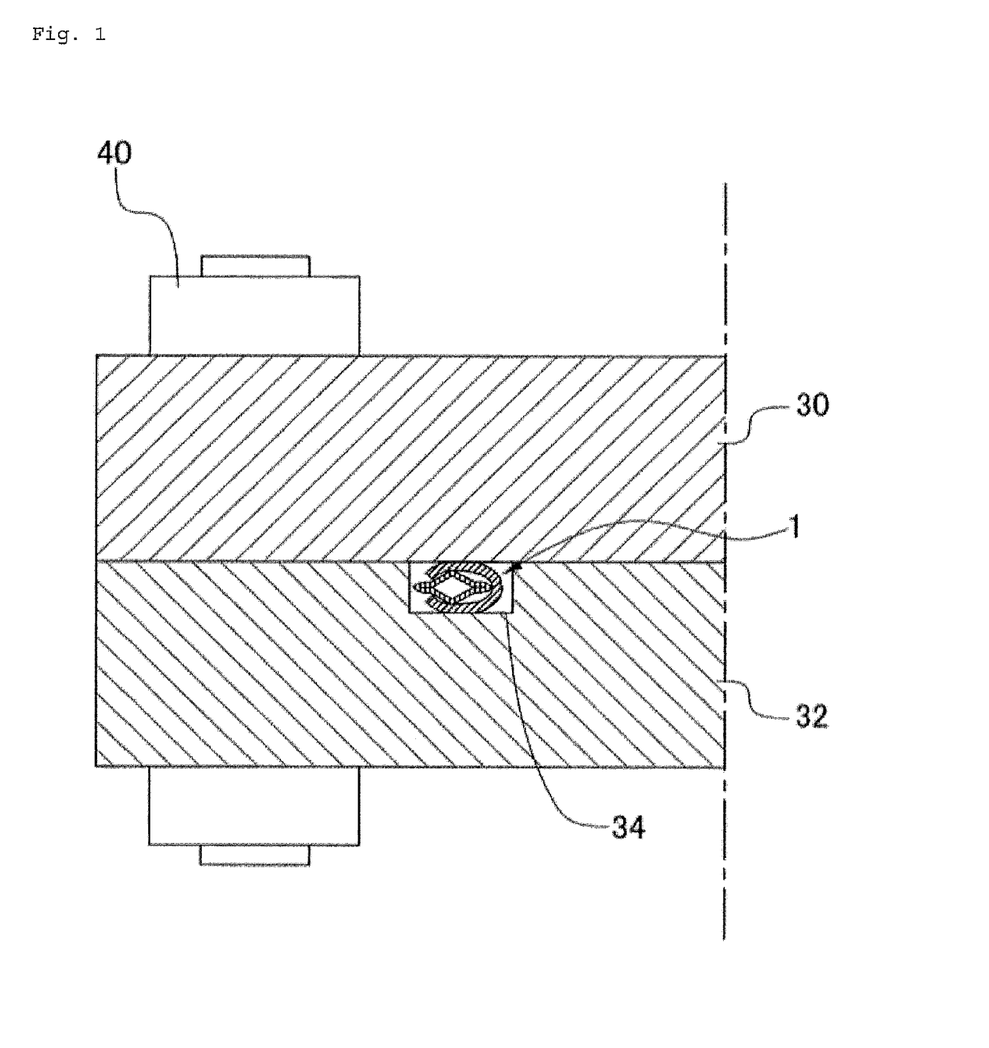
Figure 2:
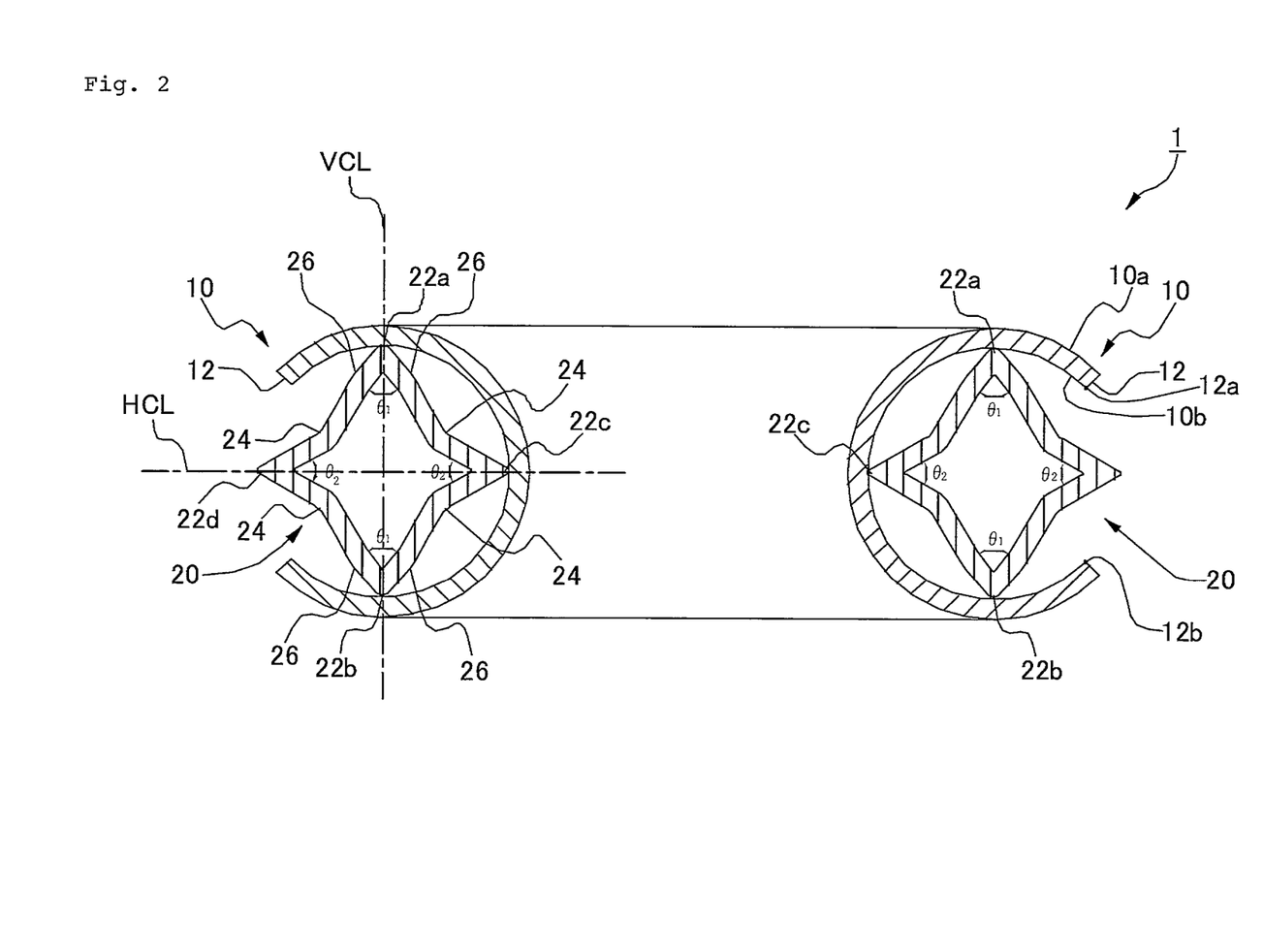
FIG. 2 is a cross-sectional view showing a metal gasket in accordance with the present invention.

FIG. 1 is a partially enlarged cross-sectional view showing a state in which a metal gasket in accordance with the present invention is used for a joint part of piping or the like. FIG. 2 is a cross-sectional view showing a metal gasket in accordance with the present invention.

A metal gasket 1 in accordance with the present invention is used for a joint part of a variety of piping of semiconductor manufacturing equipment. As shown in FIG. 1, the metal gasket 1 is mounted to a sealing groove 34 that is formed in a flange 32, and is disposed between a flange 30 and the flange 32. The metal gasket 1 is pressed in a vertical direction by being tightened with a bolt 40 until a metal touch of the flange 30 and the flange 32 is carried out. By this configuration, a space between the flange 30 and the flange 32 is sealed.

As shown in FIG. 2, the metal gasket 1 in accordance with the present invention is provided with an annular outer ring 10 and an annular inner ring 20 that has been fitted inside the outer ring 10.

For the outer ring 10, an opening 12 is formed in a circumferential direction on the circumferential side of an outside surface 10a and having a substantially C-shaped cross-section as shown in FIG. 2.

As shown in FIG. 2, the inner ring 20 is formed in a polygonal shape of a cross sectional hollow. Moreover, an upper corner part 22a that makes contact with an upper side of an inside surface 10b of the outer ring 10 and a lower corner part 22b that makes contact with a lower side of an inside surface 10b of the outer ring 10 are formed on the upper side of the cross section. An inner-circumference-side corner part 22c is formed on an inner circumference side between the upper corner part 22a and the lower corner part 22b, and an outer-circumference-side corner 22d is formed on an outer circumference side between the upper corner part 22a and the lower corner part 22b.

Here, an upper side of an inside surface 10b of the outer ring 10 indicates a part on the upper side of the opening 12. In other words, the upper side of an inside surface 10*b* of the outer ring 10 indicates an inside surface 10*b* that is located on the upper side of an upper end part 12*a* of the opening 12 for the inside surface 10*b* of the outer ring 10 in FIG. 2. Similarly, a lower side of an inside surface 10*b* of the outer ring 10 indicates a part on the lower side of the opening 12. In other words, the lower side of an inside surface 10*b* of the outer ring 10 indicates an inside surface 10*b* that is located on the lower side of a lower end part 12*b* of the opening 12 for the inside surface 10*b* of the outer ring 10. In FIG. 2, the inner-circumference-side corner part 22*c* of the inner ring 20 comes into contact with the inside surface 10*b* of the outer ring 10. However, it is not always necessary that the inner-circumference-side corner part 22*c* comes into contact with the inside surface 10*b* of the outer ring 10.

It is preferable that a top part of each bend part of the upper corner part 22*a*, the lower corner part 22*b*, the inner-circumference-side corner part 22*c*, and the outer-circumference-side corner part 22*d* is formed in a circular arc shape. In particular, it is preferable that a top part of the bend part of the upper corner part 22*a* and the lower corner part 22*b* that comes into contact with the inside surface 10*b* of the outer ring 10 is formed in a circular arc shape in order to prevent the inside surface 10*b* of the outer ring 10 from being damaged.

Moreover, two bend parts of a bend part 24 and a second bend part 26 are formed from a part closer to the inner-circumference-side corner part 22*c* or the outer-circumference-side corner part 22*d* between the upper corner part 22*a* and the inner-circumference-side corner part 22*c* and the outer-circumference-side corner part 22*d*. Furthermore, two bend parts of a bend part 24 and a second bend part 26 are also formed from a part closer to the inner-circumference-side corner part 22*c* or the outer-circumference-side corner part 22*d* between the lower corner part 22*b* and the inner-circumference-side corner part 22*c* and the outer-circumference-side corner part 22*d*.

As shown in FIG. 2, the bend part 24 is bent toward an inside of a cross section of the inner ring 20, and an inside angle of the bend part 24 is larger than 180°. On the other hand, the second bend part 26 is bent toward an outside of a cross section of the inner ring 20, and an inside angle of the second bend part 26 is smaller than 180°.

For the inner ring 20 shown in FIG. 2, the upper corner part 22*a* described above comes into contact with the highest side part of the inside surface 10*b* of the outer ring 10, and the lower corner part 22*b* described above comes into contact with the lowest side part of the inside surface 10*b* of the outer ring 10.

For the metal gasket 1 in accordance with the present invention, a contact part of the upper corner part 22*a*, the lower corner part 22*b*, and the inside surface 10*b* of the outer ring 10 is not restricted to the part described above. However, it is preferable that the upper corner part 22*a* comes into contact with the highest side part of the inside surface 10*b* of the outer ring 10 and the lower corner part 22*b* comes into contact with the lowest side part of the inside surface 10*b* of the outer ring 10 as described above since a pressing force is also applied to the inner ring 20 on the instant via the outer ring 10 in the case in which the metal gasket 1 is pressed in a vertical direction.

A cross section of the inner ring 20 is formed in a line symmetric shape in a vertical direction and in a horizontal direction. In other words, the cross section of the inner ring 20 is formed in a symmetric shape in a vertical direction to the center line HCL in a horizontal direction and is formed in a symmetric shape in a horizontal direction to the center line VCL in a vertical direction as shown in FIG. 2. An inner angle θ1 of the upper corner part 22*a* and that of the lower corner part 22*b* are equal to each other, and an inner angle θ2 of the inner-circumference-side corner part 22*c* and that of the outer-circumference-side corner part 22*d* are equal to each other.

For the metal gasket 1 in accordance with the present invention, a cross section of the inner ring 20 is not restricted to be in a line symmetric shape in a vertical direction and in a horizontal direction. However, it is preferable that a cross section of the inner ring 20 is formed in a line symmetric shape at least in a vertical direction as described above since the inner ring 20 can be prevented from being shifted or inclined at an angle whereby the inner ring 20 can be held on the inside of the outer ring 10 in a stable state in the case in which the metal gasket 1 is pressed in a vertical direction as described later.

For the metal gasket 1 in accordance with the present invention, a reason that the bend part 24 and the second bend part 26 as described above are formed is in the following.

As described above, the present inventors have examined and found that a tightening force F1 in the case of a metal touch tends to be decreased in the case in which an inner angle θ2 of the inner-circumference-side corner part 122*c* and the outer-circumference-side corner 122*d* is decreased. Consequently, for the metal gasket 1 in accordance with the present invention, a bend part 24 having an inside angle larger than 180° is formed between the upper corner part 22*a* and the inner-circumference-side corner part 22*c* and the outer-circumference-side corner part 22*d* and between the lower corner part 22*b* and inner-circumference-side corner part 22*c* and the outer-circumference-side corner part 22*d*, whereby an inner angle θ2 of the inner-circumference-side corner part 22*c* and the outer-circumference-side corner 22*d* is decreased.

In addition, the present inventors have examined and found that a tightening force F1 in the case of a metal touch tends to be increased extremely in the case in which an inner angle θ1 of the upper corner part 22*a* and the lower corner part 22*b* is decreased. In the case in which the bend part 24 as described above is formed, an inner angle θ2 of the inner-circumference-side corner part 22*c* and the outer-circumference-side corner 22*d* is decreased and an inner angle θ1 of the upper corner part 22*a* and the lower corner part 22*b* is also decreased. Consequently, for the metal gasket 1 in accordance with the present invention, a second bend part 26 having an inside angle smaller than 180° is formed between the upper corner part 22*a* and the lower corner part 22*b* and the bend part 24, whereby the inner angle θ1 of the upper corner part 22*a* and the lower corner part 22*b* is not too decreased.

It is preferable that a bending degree of the second bend part 26 is smaller than that of the bend part 24. In other words, it is preferable that an outer angle of the second bend part 26 is smaller than the inner angle of the bend part 24. In the case in which the second bend part 26 is bent greatly, the upper corner part 22*a* and the lower corner part 22*b* are concaved inside and deformed in the state shown in FIG. 3(C) described later for instance. Consequently, a contact stress of the upper corner part 22*a* and the lower corner part 22*b* and the inside surface 10*b* of the outer ring 10 is decreased, whereby a sealing performed may be deteriorated.

The inner angle θ1 of the upper corner part 22*a* and the lower corner part 22*b* is preferably in the range of 50° to 120°, more preferably in the range of 60° to 90°, depending on a shape and material of the metal gasket 1 and a displacement amount until a metal touch. Moreover, the inner angle θ2 of the inner-circumference-side corner part 22*c* and the outer-circumference-side corner 22*d* is preferably 90° or less, more preferably in the range of 35° to 80°. In the present embodiment, the inner angle θ1 is about 75° and the inner angle θ2 is about 60°.

A constitutional material of the outer ring 10 and the inner ring 20 is metal. In this case, it is preferable that metal that constitutes the inner ring 20 is a harder metal than metal that constitutes the outer ring 10. For instance, it is preferable that the outer ring 10 is made of aluminum that is called light metal and the inner ring 20 is made of metal harder than aluminum, such as stainless steel.

In the case in which the inner ring 20 is made of metal having a hardness degree higher than that of the outer ring 10 as described above and a metal gasket 1 in accordance with the present invention is disposed between the flanges 30 and 32 and pressed in a vertical direction as shown in FIG. 1, the inner ring 20 that is hard to be deformed relatively and that has a high hardness degree strongly presses the outer ring 10 having a low hardness degree to the flanges 30 and 32. The outer ring having a low hardness degree obtains a high sealing performance since the settlement to the flange 30 is excellent.

Figures 3A, 3B, 3C:
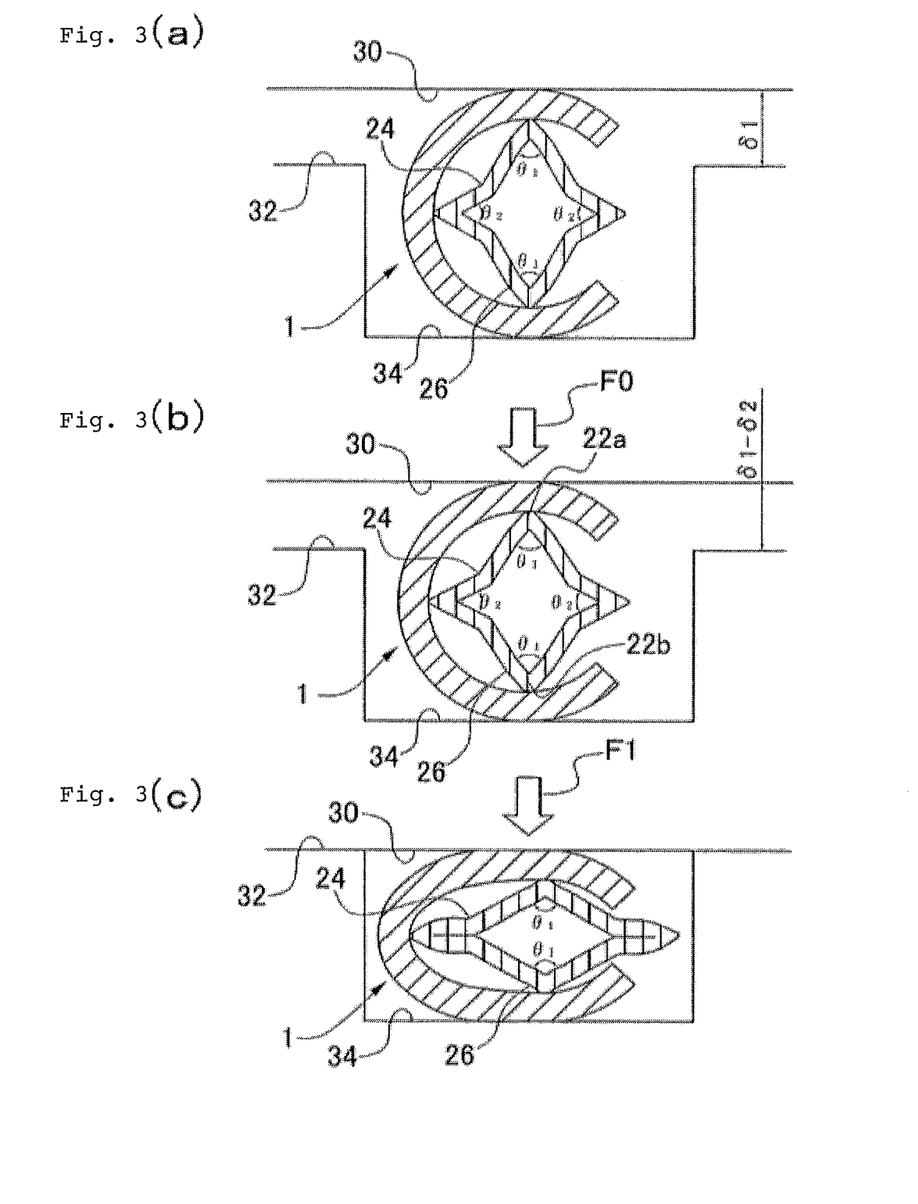
FIG. 3 is a cross-sectional view showing a state in which a metal gasket in accordance with the present invention is pressed in a vertical direction and deformed.
Figure 4:
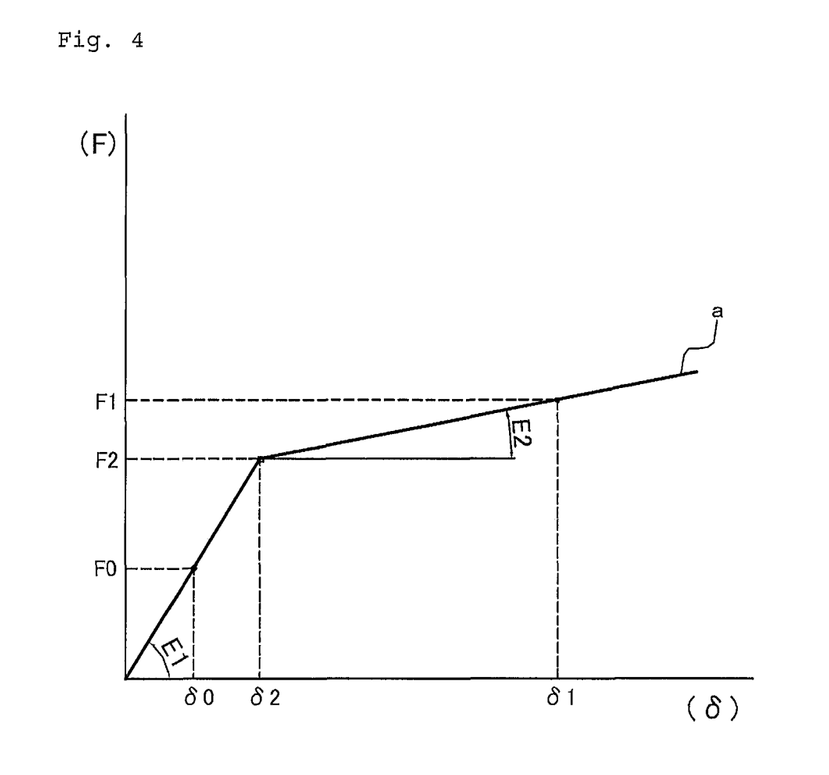
FIG. 4 is a graph showing a relationship between a tightening force F and a displacement amount δ for a metal gasket in accordance with the present invention.

Moreover, in the case in which a soft layer (not shown) that is formed by coating polytetrafluoroethylene (PTFE) or polyimide or plating silver, nickel, or copper is formed on the outside surface 10a of the outer ring 10, the settlement to the flange 30 of the outer ring 10 is more excellent, and the outer ring 10 obtains a higher sealing performance, FIG. 3 is a cross-sectional view showing a state in which a metal gasket in accordance with the present invention is pressed in a vertical direction and deformed. FIG. 4 is a graph showing a relationship between a tightening force F and a displacement amount δ for a metal gasket in accordance with the present invention. Here, FIG. 3(a) indicates an initial state before the metal gasket 1 is deformed, FIG. 3(b) indicates a state in which the metal gasket 1 is pressed and deformed and a predetermined sealing performance is obtained, and FIG. 3(c) indicates a state in which the metal gasket 1 is pressed and deformed until a metal touch of the metal gasket 1 is carried out. The symbols F0, F1, δ1, and δ2 in FIG. 3 are corresponded to tightening forces F0 and F1 and displacement amounts δ1 and δ2 that are shown in the graph of FIG. 4, respectively.

As shown in FIG. 3, in the case in which the metal gasket 1 is pressed in a vertical direction in the initial state shown in FIG. 3(a), a leading end part of the upper corner part 22a and the lower corner part 22b of the inner ring 20 is pressed and deformed in the first place. A compressive deformation by a displacement amount δ2 in a vertical direction is then carried out for the entire metal gasket 1 to enter the state shown in FIG. 3(b). In this state, an inner angle θ1 of the upper corner part 22a and the lower corner part 22b and an inner angle θ2 of the inner-circumference-side corner part 22c and the outer-circumference-side corner part 22d are hardly changed from their initial state. The inner angle θ1 is slightly increased and the inner angle θ1 is slightly decreased. In other words, a displacement amount δ2 of the metal gasket 1 in the state shown in FIG. 3(b) is mainly caused by a compressive deformation of a leading end part of the upper corner part 22a and the lower corner part 22b.

In the case in which the metal gasket 1 is still pressed while a tightening force F is increased, the upper corner part 22a and the lower corner part 22b of the inner ring 20 are opened and deformed by slow degrees, and the inner angle θ1 is increased by slow degrees. Moreover, the inner-circumference-side corner part 22c and the outer-circumference-side corner part 22d of the inner ring 20 are closed and deformed by slow degrees, and the inner angle θ2 is decreased by slow degrees. In a definitive fashion as shown in FIG. 3(c), the inner ring 20 is pressed in a vertical direction and deformed, the bend part 24 on the upper side and the bend part 24 on the lower side come into contact with each other, and the inner angle θ2 of the inner-circumference-side corner part 22c and the outer-circumference-side corner part 22d becomes 0°. A compressive deformation by a displacement amount δ1 in a vertical direction is then carried out for the entire metal gasket 1.

In this case, until the metal gasket 1 is deformed by a predetermined displacement amount δ2 from the initial state, a large tightening force F is required to a displacement amount per unit. In other words, as shown in FIG. 4, an inclination in the early stages for a line a of the graph is a rapid inclination E1. On the other hand, until a displacement amount of the metal gasket 1 is changed from δ2 to δ1, a deformation is carried out by a small tightening force F to a displacement amount per unit. In other words, as shown in FIG. 4, an inclination E1 in the early stages for a line a of the graph is a gradual inclination E2.

Figure 5:
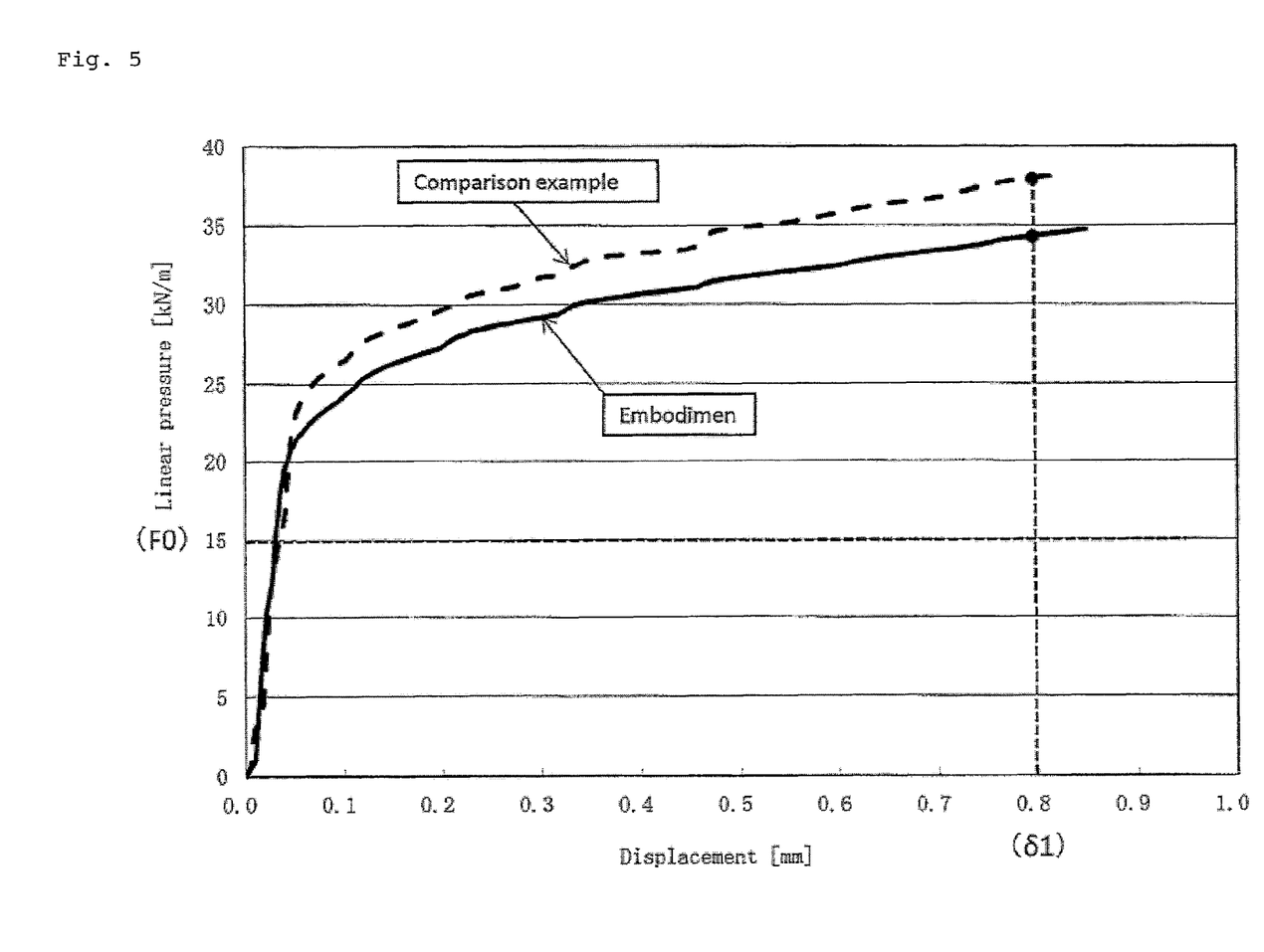
FIG. 5 is a graph showing a result of an analysis of a relationship between a tightening force and a displacement amount using the finite element method in the case in which a metal gasket 1 in accordance with the present invention is an embodiment and a metal gasket 100 in accordance with Patent Literature 3 is a comparison example.

FIG. 5 is a graph showing a result of an analysis of a relationship between a tightening force and a displacement amount using the finite element method in the case in which a metal gasket 1 shown in FIG. 2 in accordance with the present invention is an embodiment and a conventional metal gasket 100 shown in FIG. 7 in accordance with Patent Literature 3 is a comparison example. A vertical axis of the graph of FIG. 5 indicates a linear pressure and a horizontal axis of the graph indicates a displacement amount.

The linear pressure of a vertical axis of the graph is a tightening force per unit length that is applied to a metal gasket in the case in which the metal gasket is tightened and is defined as the following expression (1):

$$\text{Linear pressure} = \text{tightening force} \div \text{length of a central circumference of a metal gasket} \quad (1)$$

In the finite element analysis, for the metal gasket 1 in accordance with the embodiment and the metal gasket 100 in accordance with the comparison example, while the inner ring 120 of the comparison example is formed in a square shape, the condition of the metal gasket 1 of the embodiment is equivalent to that of the inner ring 120 of the comparison example except that the bend part 24 and the second bend part 26 described above are formed in the inner ring 20 of the embodiment. In other words, a material, a length of a central circumference, and a shape size of a cross section of the outer ring 10 of the embodiment and the outer ring 110 of the comparison example are specified as the same conditions, and a material, a length of a central circumference, and a thickness, height, and width of a cross section of the inner ring 20 of the embodiment and the inner ring 120 of the comparison example are specified as the same conditions.

As shown in FIG. 5, an inclination in the early stages is a rapid inclination for both the embodiment and the comparison example. This means that the metal gasket 1 in accordance with the embodiment has a sealing performance almost equivalent to that of the metal gasket 100 in accordance with the comparison example.

As shown in FIG. 5, an inclination in the state in which a linear pressure that is applied to the metal gasket is larger than F0 (15 KN/m in this embodiment) and the metal gasket obtains a predetermined sealing performance is a gradual inclination for the embodiment as compared with the comparison example. Moreover, a linear pressure for a displacement amount δ1 (0.8 mm in this embodiment) in the case of a metal touch is 34.3 KN/m for the embodiment and 38.1 KN/m for the comparison example, that is, a linear pressure of the embodiment is decreased by about 10%.

As described above, the metal gasket 1 in accordance with the present invention can obtain a sealing performance almost equal to that of a metal gasket that is disclosed in Patent Literature 3 with a tightening force smaller than that of the metal gasket 100 that is disclosed in Patent Literature 3. As described above, for the metal gasket 1 in accordance with the present invention, since a tightening force can be made smaller than that of the metal gasket 100 that is disclosed in Patent Literature 3, a flange can be thinned, an apparatus can be made compact and light, and a cost can be reduced. Moreover, a material (such as ceramics) that may be easily damaged as compared with a metal can also be used as a material of a flange.

Moreover, for the metal gasket 1 in accordance with the present invention, a tightening management of the metal gasket 1 can be easily carried out since a tightening force F1 until a metal touch can be decreased as compared with the metal gasket 100 that is disclosed in Patent Literature 3.

While the preferred embodiments in accordance with the present invention have been described above, the present invention is not restricted to the embodiments, and various changes, modifications, and functional additions can be thus made without departing from the scope of the present invention.

Figure 6:
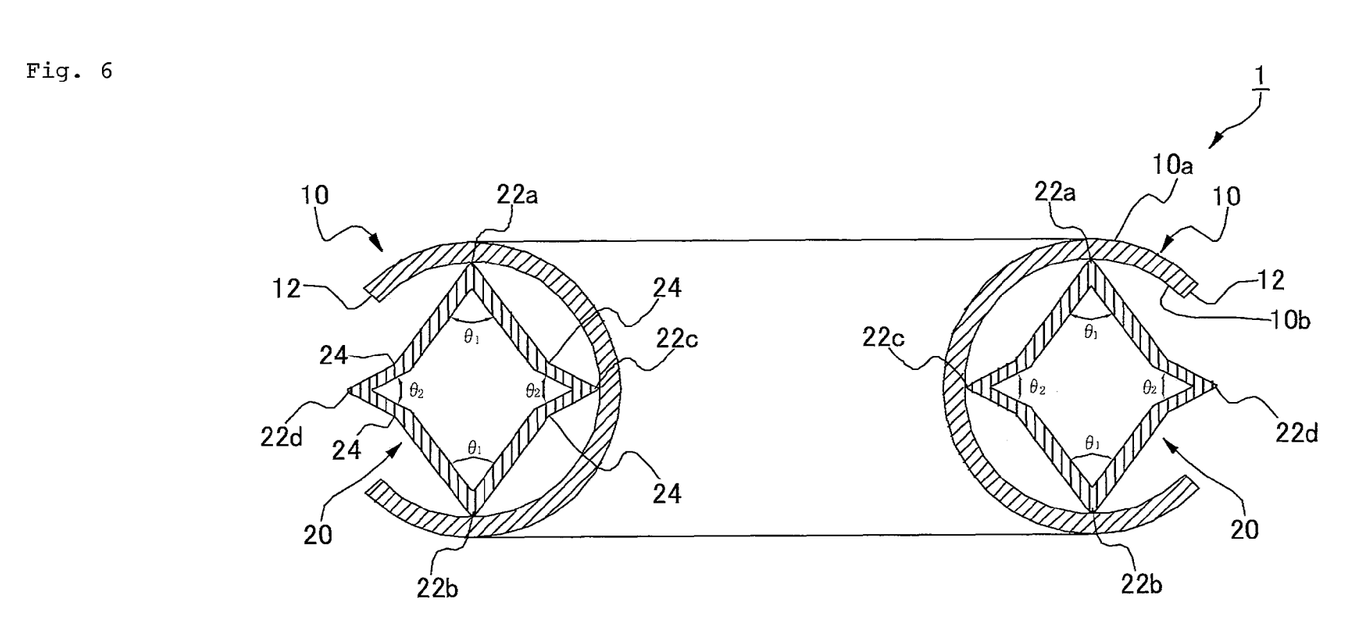
FIG. 6 is a cross-sectional view showing a metal gasket in accordance with another embodiment of the present invention.

For instance, although two bend parts of the bend part 24 and the second bend part 26 are formed in the embodiment described above, the present invention is not restricted to this configuration. As shown in FIG. 6, a bend part 24 having an inner angle smaller than 180° are formed between the upper corner part 22a and the inner- and outer-circumference-side corner parts 22c and 22d; and between the lower corner part 22b and the inner- and outer-circumference-side corner parts 22c and 22d at least.

Moreover, in the embodiment described above, the opening 12 of the outer ring 10 is formed in a circumferential direction on the outer circumference side of the outside surface 10a. However, the metal gasket 1 in accordance with the present invention is not restricted to this configuration, the opening 12 of the outer ring 10 can also be formed in a circumferential direction on the inner circumference side of the outside surface 10a.

REFERENCE SIGNS LIST

1: Metal gasket
10: Outer ring
10a: Outside surface of the outer ring
10b: Inside surface of the outer ring
12: Opening
12a: Upper end part of the opening
12b: Lower end part of the opening
20: Inner ring
22a: Upper corner part
22b: Lower corner part
22c: Inner-circumference-side corner part
22d: Outer-circumference-side corner part
24: Bend part
26: Second bend part
30 and 32: Flanges
34: Sealing groove
40: Bolt
100: Metal gasket
110: Outer ring
112: Opening
120: Inner ring
122a: Upper corner part
122b: Lower corner part
122c: Inner-circumference-side corner part
122d: Outer-circumference-side corner part
130 and 132: Flanges
134: Sealing groove
$\theta 1$: Inner angle of the upper corner part and the lower corner part
$\theta 2$: Inner angle of the inner-circumference-side corner part and the outer-circumference-side corner part

The invention claimed is:

1. An annular metal gasket for sealing a space between members by being pressed in the vertical direction in a state of being mounted between the members, the metal gasket comprising an annular outer ring having a substantially C-shaped cross-section and having a circumferential-direction opening formed therein; and an annular inner ring fitted inside the outer ring,
wherein the inner ring is formed so as to have a polygonal cross-section comprising:
an upper corner part that makes contact with an upper side of an inside surface of the outer ring;
a lower corner part that makes contact with a lower side of the inside surface of the outer ring;
an inner-circumference-side corner part formed on an inner-circumference side of the inner ring so as to be positioned between the upper corner part and the lower corner part; and
an outer-circumference-side corner part formed on an outer-circumference side of the inner ring so as to be positioned between the upper corner part and the lower corner part, and
a plurality of first bend parts having an inner angle larger than 180° are formed between the upper corner part and the inner-and outer-circumference-side corner parts; and between the lower corner part and the inner-and outer-circumference-side corner parts.

2. A metal gasket as defined in claim 1, wherein a cross section of the inner ring is formed in a line symmetric shape in a vertical direction.

3. A metal gasket as defined in claim 1, further comprising a second bend part having an inside angle smaller than 180° between the upper corner part and the first bend part formed between the upper corner part and the inner-circumference-side corner part, between the upper corner part and the first bend part formed between the upper corner part and the outer-circumference-side corner part, between the lower corner part and the first bend part formed between the lower corner part and the inner-circumference-side corner part, and between the lower corner part and the first bend part formed between the lower corner part and the outer-circumference-side corner part.

4. A metal gasket as defined in claim 2, further comprising a second bend part having an inside angle smaller than 180° between the upper corner part and the first bend part formed between the upper corner part and the inner-circumference-side corner part, between the upper corner part and the first bend part formed between the upper corner part and the outer-circumference-side corner part, between the lower corner part and the first bend part formed between the lower corner part and the inner-circumference-side corner part, and between the lower corner part and the first bend part formed between the lower corner part and the outer-circumference-side corner part.

* * * * *

UNITED STATES PATENT AND TRADEMARK OFFICE
CERTIFICATE OF CORRECTION

PATENT NO. : 8,807,573 B2  
APPLICATION NO. : 13/981218  
DATED : August 19, 2014  
INVENTOR(S) : Ohmi et al.

Page 1 of 1

It is certified that error appears in the above-identified patent and that said Letters Patent is hereby corrected as shown below:

On the title page, Column 2, Item [57] Abstract, Line 8, delete "Inner" and insert -- inner --

In the Claims

Column 12, Line 35, Claim 1, delete "inner-and" and insert -- inner- and --

Column 12, Line 36, Claim 1, delete "inner-and" and insert -- inner- and --

Signed and Sealed this  
Sixteenth Day of December, 2014

Michelle K. Lee  
*Deputy Director of the United States Patent and Trademark Office*